UNITED STATES PATENT OFFICE.

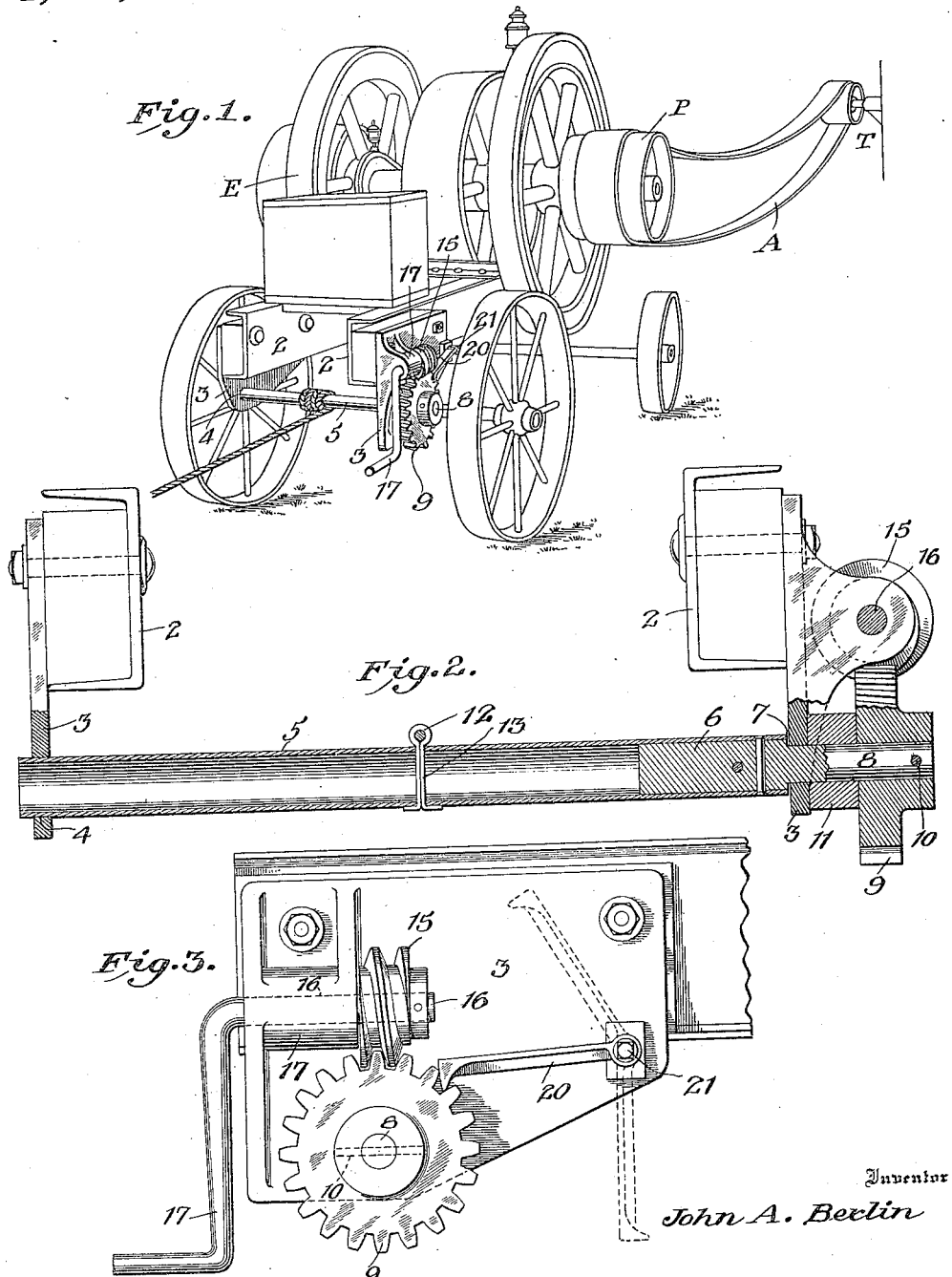

JOHN A. BERLIN, OF TRIPOLI, IOWA.

PORTABLE POWER-PLANT.

1,282,526.  Specification of Letters Patent.  Patented Oct. 22, 1918.

Application filed March 22, 1918. Serial No. 224,009.

*To all whom it may concern:*

Be it known that I, JOHN A. BERLIN, a citizen of the United States, residing at Tripoli, in the county of Bremer and State of Iowa, have invented certain new and useful Improvements in Portable Power Plants; and I do hereby declare the following to be a full, clear, and exact description of the invention, such as will enable others skilled in the art to which it appertains to make and use the same.

This invention relates to portable power plants and more particularly to that type of power plants comprising a wheeled truck of suitable character provided with a combustion engine driving a main shaft, having a pulley to carry a belt by which power may be transmitted to any desired instrument as for instance a thresher. It is one of the objects of the present invention to provide a portable power plant for driving various forms of apparatus at different localities, and having means for conveniently and effectively securing the desired tension of the transmitting belt, applicable to the master pulley on the driving plant.

With these and other objects in view as will be rendered manifest in the following specification, the invention consists of the construction, combination and in details hereinafter described with relation to the embodiment of the invention illustrated in the accompanying drawings, in which Figure 1 is a perspective view of a wheeled truck gas engine showing it connected by a belt to a driving pulley of a suitable apparatus to be driven and the tension controlling means. Fig. 2 is an enlarged detail sectional view looking toward the end of the truck. Fig. 3 is a detailed view in side elevation of the gearing and locking device.

It is desirable to securely control the tension of the transmitting belt as A, by which power is transmitted to any suitable instrument, as for instance a threshing machine, illustrated in part at T, the belt being hitched to a light portable wheeled truck carrying a gas engine E, the whole forming a portable power plant. To secure the desired tension of the belt A and overcome the tendency of the truck to move toward the driven apparatus, the frame of the truck is herein shown as provided at the ends of its sills 2, with vertical side bearing plates 3, each of which has a journal portion 4, axially alined respectively and between these is extended a reeling sleeve or sectional shaft structure consisting of a tubular member 5, one end of which passes through the journal portion 4 of one plate 3, and is supported therein, while its opposite end is pinned or otherwise secured upon the enlarged section of a spindle 6 having a shoulder 7 beyond which it is turned down as at 8 to receive a gear 9, which is pinned or otherwise fastened thereon as at 10. The end of the sleeve may register with the shoulder 7, which together with an intermediate spacing portion 11, on the opposite side of the adjacent plate 3, serves to prevent longitudinal movement of the composite shaft 6—8. A tension member such, for instance, as a cable, chain or other suitable device indicated at 12, may be secured as by means of a key 13, to the reel sleeve 5, so that when the other end of the cable 12 is attached to a stationary object then upon rotation of the gear 9, the reeling shaft 5 is rotated, and the cable 12 is wound up so as to place the belt A under tension.

To secure the winding of the reel shaft, the gear 9 is engaged by a short worm 15, which is pinned or otherwise secured on the horizontal section 16 of a crank shaft, the crank arm 17, of which is bent angularly and disposed to swing across the end of its respective plate 3, which is shown as provided with a horizontal bearing or journal portion 17, bored parallel to the sill of the truck frame the journal portion 17 projecting laterally from the upper portion of its plate 3 and disposed at one edge thereof as clearly shown in Fig. 3. While the worm wheel 9 will be securely locked against rotation by its meshing with the worm 15, yet if desired, a further lock may be provided by means of a pawl 20, disposed tangentially in its locking position to the wheel 9 and is freely turnable about a stud pivot 21, projecting from the side of the plate 3.

From the above, it will be seen that after the belt A is thrown on to the main pulley P of the power plant and on to the pulley of the thresher T, then the belt can be placed under tension by turning the crank shaft 16 after the remote end of the cable 12 has been attached to any fixed structure or object.

What I claim is:

1. In combination, a portable power plant having a pulley for driving a belt attachable thereto, an instrument to be driven by the belt from the plant, and means on the frame of the plant for regulating the tension of the belt comprising a bearing attached to a sill member of the plant, a crank shaft with its arm at one side of the bearing and a worm fixed on its opposite end, a worm gear meshing with the worm and having its shaft extended transversely of the sills and supported in brackets thereon, and a tension cable attached to the last named shaft and attachable at its other end to a stationary object.

2. In combination with an apparatus to be power operated, a portable power vehicle having a driving pulley for driving a belt and thereby said apparatus, a pair of side plates attached to the vehicle frame and having alined bearings pendant from the frame of the vehicle, one of said plates having a lateral bearing bored parallel to the plane of the plate, a crank shaft journaled therein with a worm fast thereon, a reeling shaft below the frame and mounted in the plate bearings for winding a tensioning element, and a gear on the reeling shaft controlled by the worm.

3. In combination, a wheeled power plant with a driving pulley, and the belt operated thereby and a driven instrument to which the belt is attached; a flexible tensioning element and a winding shaft on the plant frame of the plant to which the element is attached; and an operating and locking gear set for the shaft whereby when the apparatus is set up and the tensioning element is attached to a stationary body, the belt is tensioned by a pull which is on a line parallel to the line of draft of the belt and which shifts the vehicle on its wheels.

4. In combination, a wheeled power plant with a driving pulley, and the belt operated thereby, and a driven instrument to which the belt is attached; a flexible tensioning element and a winding shaft on the plant frame of the plant to which the element is attached; and a worm gear set for the shaft, whereby when the apparatus is set up and the tensioning element is attached to a stationary body, the belt is tensioned by a pull which is on a line parallel to the line of draft of the belt and which shifts the vehicle on its wheels.

In testimony whereof I affix my signature in presence of two witnesses.

JOHN A. BERLIN.

Witnesses to signature:
H. H. NEVERMANN,
THEO POCKELS.

Copies of this patent may be obtained for five cents each, by addressing the "Commissioner of Patents, Washington, D. C."